United States Patent [19]

Bruce et al.

[11] 4,333,961
[45] Jun. 8, 1982

[54] PREPARATION OF THIN, ALIGNED MAGNETIC COATINGS

[75] Inventors: Calvin A. Bruce; Andrew M. Homola; Max R. Lorenz, all of San Jose, Calif.

[73] Assignee: International Business Machines Corporation, Armonk, N.Y.

[21] Appl. No.: 259,270

[22] Filed: Apr. 30, 1981

[51] Int. Cl.$^3$ .............................................. B05D 1/04
[52] U.S. Cl. ...................................... 427/13; 427/48; 427/54.1; 427/127; 427/130; 427/131; 427/299
[58] Field of Search ................... 427/13, 48, 127, 131, 427/130, 54.1, 299

[56] References Cited

FOREIGN PATENT DOCUMENTS 221527 5/1959 Australia .

Primary Examiner—Bernard D. Pianalto
Attorney, Agent, or Firm—Walter J. Madden, Jr.

[57] ABSTRACT

A monolayer magnetic coating is prepared by applying magnetic particles which have an electrostatic charge in an aqueous environment to an active layer on a substrate, the active layer having an electrostatic charge in an aqueous environment opposite to the charge on the magnetic particles so that the particles bond to the active layer.

15 Claims, No Drawings

PREPARATION OF THIN, ALIGNED MAGNETIC COATINGS

TECHNICAL FIELD

This invention relates to methods for producing magnetic coatings having magnetic particles therein which are of small size, of uniform distribution throughout the coating, and magnetically aligned.

BACKGROUND ART

In the preparation of magnetic recording materials, such as for magnetic disks, it has been common to use magnetic particles, like $Fe_2O_3$, dispersed in a binder mixture to form the magnetic recording material. A dispersion is usually formed by milling the ingredients together for an extended period of time in an effort to thoroughly coat the magnetic particles with the binder ingredients and to break up collections or aggregations of such particles. Magnetic particles of this type tend to cling together and it is desirable to reduce or eliminate this aggregation of particles in order to produce smaller effective magnetic particle sizes for higher density magnetic recording. The degree of uniform dispersion of the magnetic particles in the binder is an important factor in determining the final quality of the magnetic coating, as measured by the parameters of surface smoothness, orientation ratio, signal-to-noise ratio, off-track performance, modulation noise, coercive force and wear properties.

After filtering, this dispersion is coated onto a substrate by spin coating, dip coating, spray coating or doctor blade (gravure) coating. The magnetic particles in the wet coating are then magnetically aligned by moving the coated substrate past a magnetic field. The coating is then cured to remove solvent and improve hardness and durability. The cured magnetic coating may be ground to reduce the coating thickness and then buffed to improve surface roughness.

In order to increase the recording areal density, the coating thickness has to be reduced. Mechanical grinding to less than 5000 Å is difficult, if not beyond the limit of present technology. Also, as the coating thickness is reduced, the signal amplitude is decreased and this presents a major problem. New, higher moment particles and a higher particle volume concentration (PVC) are needed. PVC may be defined as the ratio of the volume of magnetic material in the coating to the sum of the volume of the binder material and the volume of the magnetic material. The PVC of current magnetic coatings is about 20–30%, and it is difficult to increase this and still maintain the rheological properties of the organic dispersion.

THE INVENTION

The present process involves the laying down of a monolayer of magnetically aligned particles where the thickness of the magnetic layer is limited only by the diameter of the magnetic particles. Using a commercially available magnetic material, such as Pfizer's 2228 $\gamma$-$Fe_2O_3$ particles, a 1000 Å thick magnetic layer can result. In addition, this monolayer can be highly oriented magnetically, with an orientation ratio of 3–4. Consequently the PVC is much higher than conventional particulates, with a PVC of up to 50%. Since the process uses excellently dispersed particles, the defect density is also much lower.

Best Mode Embodiment and Industrial Applicability

The magnetic particles are first treated with HCl to facilitate the separation of aggregated particles. The acid is then removed and the particles are dispersed ultrasonically at pH=3.5. A colloidal silica dispersion in water (approximately 70 Å particles) is prepared and the pH of this dispersion is adjusted to 3.5 as taught and claimed in copending application Ser. No. 128,763, filed Mar. 10, 1980, assigned to the same assignee as the present application. At this pH, silica has a negative surface charge and $Fe_2O_3$ or Co doped $Fe_2O_3$ has a positive surface charge. By injecting an excess of such negatively charged colloidal silica particles into the ultrasonic flow cell containing the dispersion of positively charged $Fe_2O_3$, the colloidal silica particles encapsulate the $Fe_2O_3$, as discussed extensively in the above identified copending application. The final dispersion consists of colloidal silica-coated $Fe_2O_3$, which has a negative surface charge when the pH is higher than 2.5.

The excess unadsorbed silica particles can be removed by any suitable method, such as by centrifuging, continuous filtration through a porous medium, or by decantation. The magnetic particles may be concentrated through a magnet. The dispersion is concentrated to approximately 10% and the pH adjusted to 6–8. The silica-coated magnetic oxide has improved stability due to the physical separation caused by the $SiO_2$ particles and the increased negative surface charge due to the presence of the adsorbed silica particles.

Rigid substrates consist of AlMg alloy machined to a high degree of flatness and good surface smoothness and whose surface is carefully cleaned. Depending on a number of factors, a subcoat may or may not be required on the substrate. If a subcoat is employed, a suitable one may be formed by spinning onto the substrate a mixture containing an epoxy, such as Dow DER 667, and a phenolic, such as Monsanto Resinox P97, in butyl cellosolve, and curing the subcoat at 240° C. for two hours.

If a subcoat is employed, it may be either polished with dry $Al_2O_3$ tape or wet $Al_2O_3$ free abrasive, or ground and polished using standard manufacturing techniques. The disks with a subcoat can be tested to assure that a flat, asperity-free surface exists before coating with the active and magnetic layers.

The present coating process depends on electrostatic interaction of ionically charged particles with an oppositely ionically charged surface in an aqueous environment. This requires an active or charged surface layer, and there are several ways in which such an active layer can be produced. In one embodiment, the active layer is produced by spinning an epoxy (Shell Epon 1004) and a polyamide (Versamid 100, Henkel Co.) in cyclohexanone either onto the substrate or the subcoat, if one is employed, to form an approximately 500 Å thick layer. The layer is baked at 150° C. for one half hour to partially polymerize (reduce the low molecular weight fraction) without losing all the $-NH_2$ and $>NH$ groups which are the source of the positive surface charge in an aqueous environment.

As an alternative for producing the active layer, deposition of a monolayer of cationic polyelectrolyte from an aqueous solution such as polyethyleneimine or polyacrylamide may be employed. Washing off the excess completes the formation of the active layer. As additional alternate techniques for producing the active layer, ultraviolet grafting or plasma polymerization may be employed.

After the active layer is in place, the disk substrate may be put on a slow moving coater with a speed range from 0.1 to 5 RPM and rotated over the gap of a permanent magnet. The silica-coated magnetic particles dispersed in water are injected or pumped into the region of high magnetic field strength of the magnet where they form a bar on top of the disk. The particles are thus magnetically oriented while they are still in the dispersion before the actual coating process takes place. The negatively charged particles bond to the positively charged active layer on the substrate through electrostatic interaction. Once the particles are on the surface, they are there to stay. Any excess particles are easily washed off because of the electrostatic repulsion between particles. The coated disk is then spun dry and heated for 15 minutes at 150° C.

As an alternative to the above process, the disk may first be covered with a thin layer of water and the above technique followed.

If a higher level magnetic signal is required than can be obtained from the monolayer, another thin active layer can be spun on and the coating process with the magnetic particles is repeated. Thus, multi-layers can be built up to desired signal strength. By this multi-layer technique, a first layer of a given coercivity may be laid down, and then a second layer of a different coercivity put on. Such a structure would be useful in buried servo systems where servo information for a track following servo is recorded in a relatively high coercivity layer and data is recorded on an overlying magnetic layer of lower coercivity so that the servo information is not modified or destroyed when data is recorded on the data layer.

The spacing between such multi-layers may be varied by varying the thickness of a polymer coating, which may or may not be the same as the active layer.

To stabilize the coating, an overcoat solution can be spun on over the top of the magnetic particles. This should give a smooth surface that is also durable for magnetic recording operation. Examples of suitable overcoat materials which may be used include epoxy-Versamid, epoxy-phenolic, and polyurethanes. Since the top coat is independent of the rest of the coating, it is chosen to optimize the wear and surface properties of the final coating. After the final coating is completed, the disks may be cured for a time and at a temperature as required by the top coating material selected. The coatings are then polished to obtain sufficiently smooth and defect-free coatings for successful glide height tests.

The preceding describes negatively charged dispersed particles and positively charged active layers on the disk. However, the inverse of this may be used, i.e., positively charged particles and negatively charged active layers on the disk. Although the above description was directed to rigid metal substrates, the process can be used on any smooth substrate including flexible media.

The process described above used $\gamma$-$Fe_2O_3$, but it is not limited to such particles. Through variation of the dispersion preparation, other magnetic particles such as Co-doped $Fe_2O_3$, $Fe_3O_4$, $CrO_2$ or metallic Fe can be used. If the signal amplitude from the disk is too low, multiple monolayers can be deposited to achieve larger amplitudes, as described above. The preparation of a 6 magnetic layer disk has been demonstrated using the process of the present invention.

We claim:

1. A method for applying a magnetic coating to a disk substrate comprising the steps of:
   coating said substrate with an active coating material having an electrostatic charge in an aqueous environment to form an active layer,
   applying to the active coating material magnetic particles coated with colloidal silica, said silica-coated magnetic particles having an electrostatic charge thereon in an aqueous environment opposite to the charge on said active coating material, whereby the magnetic particles are electrostatically attracted to and bonded to said active material to form a magnetic layer, and
   applying a magnetic field to said magnetic particles to magnetically align said particles.

2. A method in accordance with claim 1, in which said magnetic particles are magnetically aligned as they are being applied to said active coating material.

3. A method in accordance with claim 1, including the step of applying a subcoat layer to said substrate prior to the application of said active layer.

4. A method in accordance with claim 1, including the step of applying a protective layer to said magnetic layer.

5. A method in accordance with claim 4, including the step of polishing said protective layer to form a smooth surface.

6. A method in accordance with claim 1, in which said active coating material has a positive electrostatic charge and said silica-coated magnetic particles have a negative electrostatic charge.

7. A method in accordance with claim 1, in which said active coating material has a negative electrostatic charge and said magnetic particles have a positive electrostatic charge.

8. A method in accordance with claim 1, including the additional steps of
   applying a second active layer to said magnetic layer, and
   applying a second magnetic layer to said second active layer.

9. A method in accordance with claim 8, in which n number of magnetic layers are interspersed between n number of active layers.

10. A method in accordance with claim 8, in which the first magnetic layer has a different magnetic coercivity than said second magnetic layer.

11. A method in accordance with claim 1, in which said active layer is produced by ultraviolet grafting.

12. A method in accordance with claim 1, in which said active layer is produced by plasma polymerization.

13. Method in accordance with claim 1, in which said substrate is rigid.

14. Method in accordance with claim 1, in which said substrate is flexible.

15. A method in accordance with claim 1, in which said substrate is covered with a thin layer of water during application of said magnetic particles to said active layer.

* * * * *